UNITED STATES PATENT OFFICE.

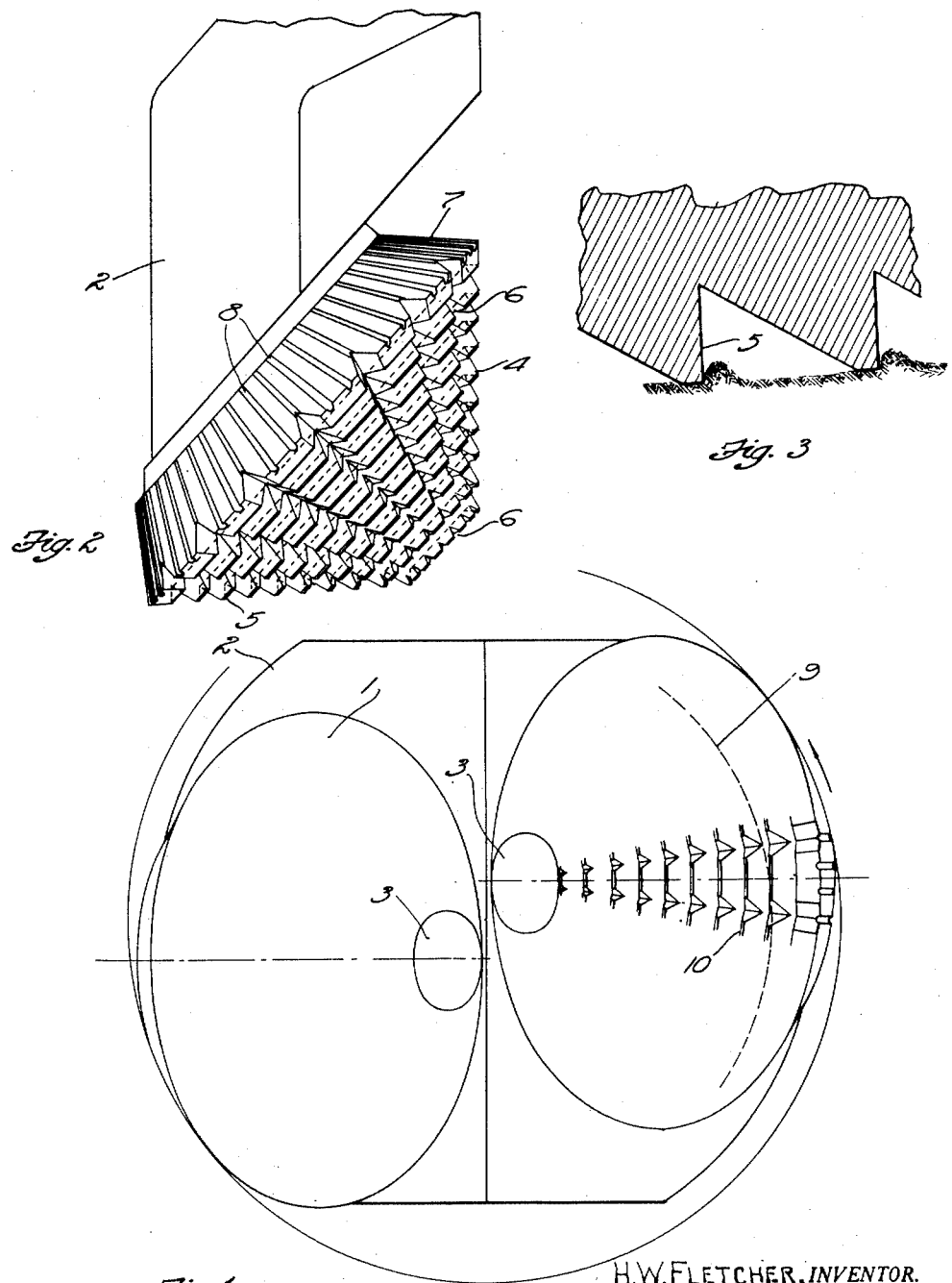

HAROLD W. FLETCHER, OF HOUSTON, TEXAS.

ROLLER BORING-DRILL.

1,388,456.   Specification of Letters Patent.   Patented Aug. 23, 1921.

Application filed January 29, 1921. Serial No. 441,062.

*To all whom it may concern:*

Be it known that I, HAROLD W. FLETCHER, a citizen of the United States, residing at Houston, Harris county, Texas, have invented a certain new and useful Improvement in Roller Boring-Drills, of which the following is a full, clear, and exact description, such as will enable others skilled in the art to which it appertains to make and use the same.

My invention relates to rotary earth boring drills and is an improvement on the type of drill bit shown and described in the patent to Hughes, Serial Number 930,759, issued August 10, 1909.

The object of my improvement is to so arrange the cutters on the head of the drill and to so form the teeth on the cutters that the teeth will have a peculiar plowing and shearing action, thus adapting the cutters to drilling certain formations which are not brittle such as packed sand, chalk rock and anhydrite.

In the patent to Hughes referred to, the cutters are frusto-conical in shape and have longitudinally extending chisel teeth thereon which are especially adapted to cut hard rock. The teeth roll on the bottom of the hole with an approximately true rolling motion and the teeth in rolling strike the rock a succession of short chisel strokes that break or chip the rock, the chips being carried away in suspension by streams of flushing water pumped down through the drill stem and the bit. The cutters in said Hughes bit were shown slightly offset to allow a slight shearing or scraping action, but this was found to cause excessive wear of the cutters without materially increasing the disintegrating or chipping action and as a result the cutters are rarely offset in practice.

I find, however, if the teeth are properly cut on the periphery of the cutters and the cutters decidedly offset from the axis of rotation of the bit, that a very marked improvement in the cutting action will be obtained.

Referring to the drawings herewith wherein like numerals are applied to like parts in each of the views: Figure 1 is a diagrammatic view showing a bottom plan of a drill employing my invention. Fig. 2 is a side elevation of a cutter formed according to my invention and Fig. 3 is a sectional detail illustrating the angle of the cutting teeth.

As will be understood, the frusto-conical cutters 1 of this type of bit, are mounted on the forward end of the drill head 2, the bearing shafts being so inclined as to bring the line of cutting contact on the bottom of the hole approximately horizontal. In the application of my improvement I contemplate offsetting the cutters relative to the central axis of rotation of the head of the drill. As will be seen from Fig. 1 the apices 3 of the cutters lie to one side of the center of the head, the offsetting being forwardly in the direction of rotation of the head indicated by the arrow. The cutting "cones" are tapered and mounted at such an angle that if the cutters were not offset, the apices of the cone, when produced, would lie in the axis of rotation of the drill and the cutters would have a true rolling motion. By offsetting the cutters as shown, the cutters no longer have a true rolling motion. They are constrained to move in a circle about the axis of the bit, but as the apices of the cutters would not lie at the axis, the cutters have a slight sliding or scraping action relative to the material operated upon.

To accomplish a more efficient cutting action with such offset cutters, I construct the teeth 4 thereon in the manner shown. The teeth are formed by cutting them coaxially upon the periphery of the "cone" so that a cutting face 5 on each tooth will be presented toward the truncated smaller end to act more efficiently on the material. These teeth may be exactly co-axial or in spiral or screw form on the cutting surface but I prefer, and have shown, the co-axial arrangement. The teeth 4 may be cut at intervals by longitudinal grooves, 6 in line with the axis of rotation of the cutter to assist in the rolling of the cutter on the bottom of the hole in an obvious manner. The larger end of the cone is beveled in an opposite direction at 7 and provided with grooves 8 thereon to act on the side of the hole and assist in maintaining the gage thereof.

To more clearly illustrate the cutting action produced by my combination of offset cones and forwardly presented coaxial teeth formed thereon, I have shown, in Fig. 1 teeth cut on a small sector only of one of the cones. The dotted line 9 is concentric with the wall of the hole and marks the track in which teeth on the cutter, at that distance from the center, will be constrained to roll. Thus the tooth 10, rolling on the bottom of the hole in the direction of the arrow, will have a combined rolling and sliding or scraping action. The forward edge of the tooth will dig into and roll up the material and the latter portion of the tooth will shear or scrape the material rolled up and shove it toward the center of the hole where it may be more efficiently carried away by the streams of flushing water. The action of each series of teeth may be compared to that of the well known disk plow, in which the cutting disks are set at an angle to the direction of movement of the plow so that the forward portion of the disk cuts the material and rolls it up and the rearward portion turns it over and shoves it to one side.

Teeth which have this movement relative to the material should preferably be of strong construction and in Fig. 3 I have shown a desirable form. There is a cutting face 5 which is presented forwardly and at an angle nearly perpendicular to the work. The cutting face is then at approximately right angles to the direction of sliding. The rearward side of this tooth is backed up by as much material as possible to prevent breaking or rapid wear of the outer cutting edge.

A cutter thus formed will act most efficiently on formations which are not too hard and brittle. Packed sand, either dry or containing water or oil, and some forms of moderately soft rock such as chalk or anhydrite, may be cut at a much higher speed than by the previous forms of rock bit.

Having thus described my invention, what I claim as new and desire to protect by Letters Patent is:

1. In a roller earth boring drill, the combination of a head, frusto-conical cutters rotatable on the forward end thereof, mounted in offset relation to the axis of rotation of the head and teeth on said cutters formed co-axially on the periphery thereof and presenting a cutting edge forwardly in the direction of sliding of said cutters.

2. In a roller earth boring drill, the combination of a head, frusto-conical cutters rotatable on the forward end thereof, mounted in offset relation to the axis of rotation of the head in a direction forwardly from said axis in the direction of rotation of said head, and teeth formed co-axially on the periphery of said cutters so as to present a cutting edge toward the smaller end of the cutter for the purpose described.

3. A roller earth boring drill, having a head with rotatable frusto-conical cutters on the forward end thereof, said cutters being offset forwardly in the direction of rotation of the head and teeth formed on the periphery of the cutter the cutting edges of which lie in planes approximately perpendicular to the axis of rotation of said cutters in the manner described.

4. A roller earth boring drill having a head with rotatable frusto-conical cutters on the forward end thereof, said cutters being offset relative to the axis of rotation of the drill and teeth formed on the periphery of the cutters in circles about the axis of rotation of the cutters and presenting a forward cutting face approximately at right angles to the direction of slide of said cutters.

5. A roller earth boring drill having offset cutters on the forward end thereof, teeth on the peripheries of each of the cutters formed in planes approximately perpendicular to the axis of rotation of each of the cutters and having forward faces on said teeth adapted to be presented at right angles to the direction in which said teeth slide.

6. In a roller earth boring drill, a head, a roller cutter mounted thereon, the axis of rotation of said cutter being offset relative to the central axis of rotation of said head, and teeth formed on the periphery of said cutter extending about the periphery thereof and presenting forward cutting faces approximately at right angles to the direction of slide of said cutter.

In testimony whereof, I hereunto affix my signature, this the 26th day of January, A. D. 1921.

HAROLD W. FLETCHER.